3,582,509
PREPARATION OF EPOXY-ANHYDRIDE COMPOSITIONS FROM AN EPOXY RESIN AND AN ACID ANHYDRIDE CONTAINING TWO CYCLIC AND ONE LINEAR ANHYDRIDE GROUP
Henryk Staniak, Blonie k, and Piotr Penczek, Warsaw, Poland, assignors to Instytut Tworzyw Sztucznych, Warsaw, Poland
No Drawing. Filed Oct. 14, 1968, Ser. No. 767,381
Claims priority, application Poland, Oct. 18, 1967, P 123,074
Int. Cl. C07c 63/00; C08c 9/18
U.S. Cl. 260—24   9 Claims

ABSTRACT OF THE DISCLOSURE

Preparation of epoxy-anhydride composition by reacting an epoxy resin with an acid anhydride containing two cyclic and one linear anhydride group. The acid anhydride has the formula:

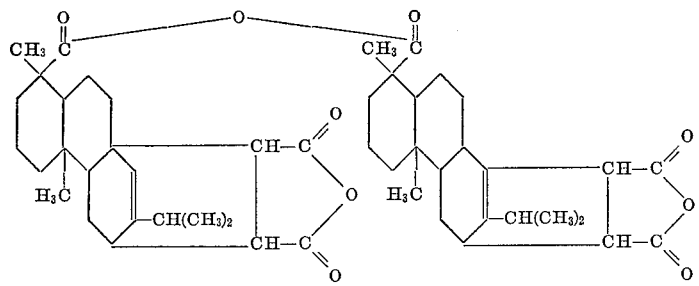

The reaction product is thermo hardened at 80–210° C.

---

The invention relates to the preparation of thermohardening compositions, having epoxide resins and an acid anhydride as main components. The said thermohardening compositions distinguish themselves by an advantageous complex of technological and processing properties.

They are mostly used for casting, encapsulating and impregnating and also as adhesives and binding materials for laminates.

Epoxide resins have been previously hardened by means of primary and secondary amines and aliphatic and aromatic polyamines or tertiary amines, polycarboxylic acids, cyclic anhydrides or dicarboxylic acids, polyanhydrides of dicarboxylic aliphatic acids, diphenols and phenol-formaldehyde resins, polyaminoamides, polymercaptans and complexes of Lewis acids.

The most frequently used curing agents have been aliphatic amines and acid anhydrides.

Aliphatic amines effect hardening at room temperature; but compositions thus hardened show a relatively low heat resistance. On the other hand, compositions hardened with acid anhydrides are hardened at elevated temperatures and have heat resistance which is far higher than compositions hardened by means of aliphatic polyamines.

Hence, said anhydrides have been used as hardening agents in epoxy compositions, where good mechanical and dielectric properties at elevated temperatures are required.

The following acid anhydrides have been used to harden epoxy resins: phthalic, maleic, chloromaleic, dichloromaleic, tetrachlorophthalic, tetrahydrophthalic, dimethyltetrahydrophthalic, butenyltetrahydrophthalic, chlorotetrahydrophthalic, endomethylenetetrahydrophthalic, hexachloro-endo-methylenetetrahydrophthalic, methyl - endomethylene-tetrahydrophthalic, hexahydrophthalic and dodecenylsuccinic anhydride and pyromellitic dianhydride.

Compositions hardened with acid anhydrides mentioned above, however, show several defects, considering their technological and processing properties in the hardening operation as well as usable qualities of hardened compositions including for example: a high melting point, poor solubility in epoxide resins, too high or too low reactivity, sublimation of an anhydride during heating, toxicity of an anhydride and a great brittleness or a relatively low heat resistance of a hardened composition.

Generally epoxide compositions hardened with compounds mentioned above have the imperfection of shrinkage in hardening, which, while lower indeed than in other casting resins such as e.g. unsaturated polyester resins, nevertheless does cause internal stresses, cracking of coatings and often undesirable changes of dimensions too.

In accordance with this inveniton, epoxy-anhydride compositions devoid of a majority of defects mentioned above can be obtained by use of an acid anhydride having the chemical formula

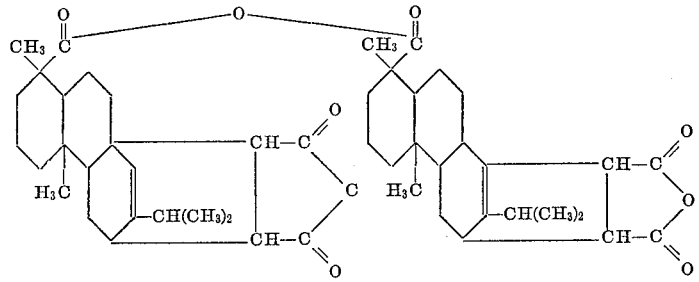

as a hardening agent.

This anhydride contains components of resin acids of rosin, particularly the diene adduct of levopimaric acid and maleic anhydride is in the molecule.

The molecule contains two cyclic and one linear anhydride groups.

The acid anhydride having this formula accordingly is not hitherto known (although the products obtained by the diene reaction of resin acids derived from rosin and maleic anhydride as well as the crystalline diene adduct of levopimaric acid and maleic anhydride isolated therefrom, which contains one cyclic anhydride group and one carboxyl group in the molecule are known).

This acid anhydride can be obtained in a process according to the invention in two different ways, wherein in the variants a rosin, resin acid, derived from rosin or purified abietic acid are used as starting materials.

According to the first varient, one of the said starting materials is heated with acetic anhydride. Acetic acid formed in the reaction and an excess of acetic anhydride are distilled off while the remainder is a mixture of resin acid anhydrides or abietic anhydride, depending on the starting material used. The remainder is subsequently heated with maleic anhydride. Maleic anhydride is used in quantity close to the stoichiometric one, namely 15.0–16.8, of maleic anhydride per 100 g. of the said anhydrides mentioned above obtained from resin acid derived from rosin.

Heating with maleic anhydride is carried out at a temperature of 100–260° C. preferably with gradually raising of the temperature in successive stages of the process. In the course of heating isomerization to levopimaric anhydride and afterwards diene addition of two molecules of maleic anhydride to a molecule of levoprimaric anhydride occur.

The thus obtained products are not pure and the mixtures have a consistency close to that of rosin.

The second variant of preparing acid anhydride having a structure set forth above consists in heating of the known diene adduct of resin acids derived from rosin and maleic anhydride with acetic anhydride. The acetic acid formed and an excess in the reaction of an acetic anhydride are distilled off.

As starting materials, diene adducts obtained from various kinds of resin or from purified abietic acid can be used. The said adducts having a consistency close to rosin are used as a crude mixture in form of the crystalline diene adduct of levopimaric acid and maleic anhydride, being isolated by crystallization from products of heating of rosin, its resin acids or purified abietic acid with maleic anhydride.

In order to facilitate mixing of the acid anhydride, obtained according to the invention, with epoxide resins advantageously the said acid anhydride is first melted with one of the acid anhydrides previously used for hardening epoxide resins; particularly the liquid acid anhydride or acid anhydride having a low melting point.

A considerable lowering of the softening point of a hardener and a reduction of viscosity after melting is thereby obtained. In compositions according to the invention the following known acid anhydrides are used as additional hardeners: hexahydrophthalic, tetrahydrophthalic, endomethylenetetrahydrophthalic, methylendomethylenetetrahydrophthalic, dimethyltetrahydrophthalic, dodecenylsuccinic and maleic anhydride.

These anhydrides are used in a quantity from 5 to 200, advantageously from 20–50 parts by weight per 100 parts by weight of acid anhydride having the formula set forth above. The total quantity of acid anhydride per one epoxide group of a resin is established by the stoichiometric calculation in a similar way as for known epoxide resin compositions, hardened with acid anhydrides.

Compositions obtained from epoxide resin, acid anhydride having a formula as set forth above and possibly other acid anhydrides are relatively rigid and frail as are known non-flexibilized epoxide resin compositions, hardened with acid anhydrides. In order to flexibilize the compositions according to the invention, known flexibilizers, such as azelaic, sebacic or brassylic polyanhydrides, mixtures of said anhydrides and oligoanhydrides obtained by heating products of dimerization, polymerization or copolymerization of unsaturated acids with acetic anhydride, polysulphides and acid anhydride end groups, linear or branched polyesters having carboxyl or acid anhydride end groups or and also polyglycols are introduced therein.

In order to lower the viscosity of compositions of the invention it is advantageous to add diluents commonly used in known epoxide compositions such as phenylglycidyl ether and vinylcyclohexene dioxide.

The known accelerators for epoxide resins hardened with acid anhydrides may be also added to compositions of the invention. For this purpose the most suitable are tertitary amines such as dimethylaniline, benzyldimethylamine and tris (dimethylaminomethyl) phenol and also organic sulphur compounds, e.g. mercaptobenzothiazol or organic stannic compounds. The last compounds are used in the first place in compositions with cycloaliphatic epoxide resins. The known fillers may be introduced to compositions according to the invention. They are e.g. silica flour, porcelain powder and aluminum oxide or fibrous fillers which are glass fibre in various forms.

The acid anhydride having a structure as set forth above may be used for hardening of all known kinds of epoxide resins i.e. resins and chemical compounds containing on an average more than one epoxide group in the molecule which is directly bonded with cyclohexane, bicyclo (2.2.1) heptane or cyclopentane ring, in the form of glycidyl ether, or epoxyethyl group bonded with a hydrocarbon chain or hydrocarbon ring or in form of epoxyethylene group in a hydrocarbon chain.

Epoxide resins used in compositions according to the invention are mainly low- or average-molecular-weight resins made of bisphenol A and epichlorohydrin, epoxynovolaks (reaction products of novolaks and epichlorohydrin) (3,4 - epoxy-6-methylcyclohexylmethyl-3,4-epoxy-6 methyl cyclohexane carboxylate, 3,4-epoxy-6-methylcyclohexyl epichlorohydrin, 3,4-epoxy-6-methylcyclohexyl) methyldicyclopentadiene dioxide and epoxidized butadiene oligonmers. The said compositions according to the invention are hardened at temperatures which are usual for epoxide-anhydride compositions i.e. 80–210° C. advantageously in the range of 120–180°.

Additional hardening at the temperature of about 180° C. advantageously effects the heat resistance of said compositions and improves their dielectric properties at elevated temperatures. The thermohardened epoxide-anhydride compositions according to the invention can be used for various purposes, as they are close to known compositions made of epoxide resins and other acid anhydrides.

They are especially suitable for encapsulating electric devices, wherein a low hardening shrinkage of epoxide-anhydride compositions and their good electrical insulation properties at elevated temperatures are of special value.

Compositions according to the invention, especially with addition of liquid and low-melting acid anhydrides are also suitable for impregnation in electrical engineering as the advantages of said compositions mentioned above are of outstanding importance. The said compositions may be also used as adhesives for metals and may be disposed in form of solutions or powders.

Compositions according to the invention in form of solutions and containing hardening accelerators, after precondensation, are suitable as binders for glass fibre reinforced plastics and manufactured by compression moulding at an elevated temperature and also for thermohardening moulding compounds.

EXAMPLE I 120 g. of balmy resin having a melting point of 58° C. and 300 g. of acetic anhydride are heated up to the boiling point for 5 hours. Subsequently a mixture of an acetic acid and acetic anhydride is distilled off under a decreased pressure. The obtained product, having the melting point 43° C. is heated with 36 g. of maleic anhydride, while raising gradually for 1 hour up to 220° C. Subsequently a slight amount of volatile matters is distilled off. An acid anhydride in form of a frail brown resin having the melting point of 87° C. is obtained in an almost theoretical yield.

EXAMPLE II 1230 g. of balmy resin and 379 g. of maleic anhydrides are heated at the temperature of 140° C. After raising the temperature up to 220° C. the mixture is heated at this temperature for 1½ hours and then a slight amount of volatile matters is distilled off under a decreased pressure. 800 g. obtained diene adduct and 800 ml. of acetic anhydride are heated within 4 hours up to the boiling point. Subsequently acetic acid and acetic anhydride are distilled off at first under normal and then under decreased pressure. The acid anhydride in form of a frail, brown resin is obtained within an almost theoretical yield.

EXAMPLE III 100 g. low-molecular-weight bisphenol A epichlorohydrin epoxide resin Epidian 5 product of Zaklady Chemiczene "Sarzyna," Poland having epoxide groups content of 0.50 gram equivalent/100 g. of resin and 131 g. acid anhydride obtained as given in Example I or II are melted and subsequently 0.3 g. of benzyldimethylamine are added. The gel time of the obtained composition is 45 minutes at 130° C. The composition is cured at 130° C. for 20 hours and post-cured at 150° C. for 4 hours.

Characteristics of the obtained product:

Linear shrinkage on curing: 0.15%
Glass temperature: 112° C. determined by the thermomechanical method.
Dielectric less factor at frequency 70 Nz:

0.0018 ohm cm./20° C.
0.015 ohm cm./105° C.
0.05 ohm cm./120° C.
0.066 ohm cm./130° C.
0.55 ohm cm./155° C.

Volume resistivity:

$4.10^{16}$ ohm cm./20° C.
$7.10^{14}$ ohm cm./105° C.
$8.10^{13}$ ohm cm./120° C.
$3.10^{13}$ ohm cm./130° C.
$5.10^{11}$ ohm cm./155° C.

EXAMPLE IV

A composition as in Example III is cured at 130° C. for 20 hours and post-cured at 180° C. for 24 hours.

Characteristics of the obtained product:

Linear shinkage on curing: 0.6%
Glass temperature: 135° C.
Dielectric less factor at frequency 70 Nz:

0.0046 ohm cm./105° C.
0.0070 ohm cm./120° C.
0.018 ohm cm./130° C.
0.062 ohm cm./155° C.
0.073 ohm cm./180° C.

Volume resistivity:

$1.3.10^{15}$ ohm cm./105° C.
$4.10^{14}$ ohm cm./120° C.
$1.1.10^{14}$ ohm cm./130° C.
$4.10^{12}$ ohm cm./155° C.
$1.4.10^{11}$ ohm cm./180° C.

We claim:
1. A method of preparing epoxide-anhydride compositions which comprises mixing an epoxide resin which contains more than one epoxy group on the molecule with an acid anhydride of the formula

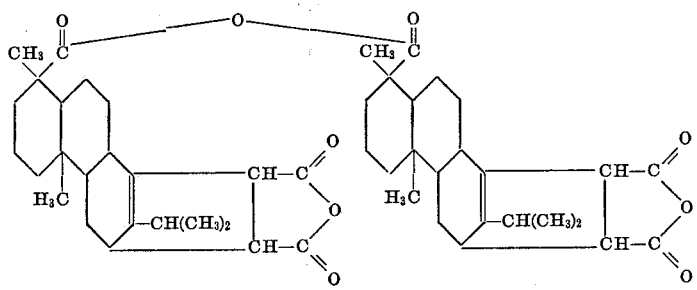

and hardening the resulting mixture at a temperature in the range of 80–210° C.

2. A method of preparing epoxide-anhydride compositions as claimed in claim 1 wherein a stoichiometric amount of said acid anhydride is present per one epoxide group of said epoxide resin.

3. A method of preparing epoxide-anhydride compositions as claimed in claim 1 wherein said resin is hardened at a temperature in the range of 120–180° C.

4. A method according to claim 1 wherein said acid anhydride is prepared by heating a material selected from the group consisting of rosin, resin acids derived from rosin, and abietic acid, in the presence of acetic anhydride, distilling off the acetic acid formed in the reaction and an excess of acetic anhydride and subsequently heating the obtained product with maleic anhydride in amount of 15.0–16.8 g. maleic anhydride per 100 g. of the said product, at a temperature in the range of 100–260° C.

5. An acid anhydride containing two cyclic and one linear anhydride group of the structure

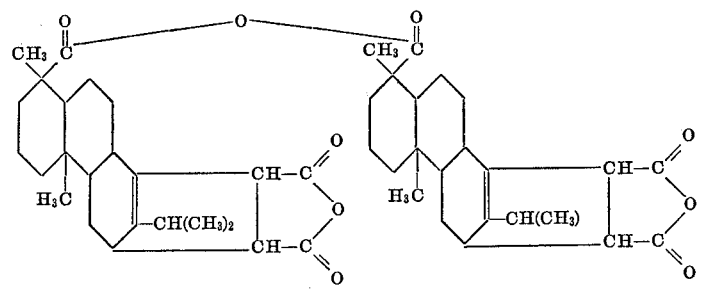

6. A method of preparing the acid anhydride as set forth in claim 5, which comprises heating an acid anhydride, obtained from a material selected from the group consisting of rosin, resin acids derived from rosin and abietic acid, with maleic anhydride at a temperature in the range of 100–260° C.

7. A method of preparing the acid anhydride as set forth in claim 6 wherein 15.0–16.8 g. of maleic acid is employed per 100 g. of the product acid anhydride.

8. The method of preparing the acid anhydride set forth in claim 5, which comprises reacting a diene adduct of resin acids derived from rosin and maleic anhydride with acetic anhydride at 100–260° C., distilling off acetic acid formed in the reaction and removing an excess of acetic anhydride by distillation.

9. The method of claim 8 wherein said diene adduct is a crystalline diene adduct of levopimaric acid and maleic anhydride, isolated by crystallization of products obtained by heating the material selected from the group consisting of rosin, resin acids derived from rosin and purified abietic acid with maleic anhydride.

References Cited

UNITED STATES PATENTS

| | | | |
|---|---|---|---|
| 2,039,243 | 4/1936 | Krzikalla et al. | 260—101 |
| 2,818,412 | 12/1957 | Eckhardt et al. | 260—346.6 |

FOREIGN PATENTS

| | | | |
|---|---|---|---|
| 785,311 | 5/1968 | Canada | 260—346.6 |
| 1,070,866 | 6/1967 | Great Britain | 260—346.6 |

OTHER REFERENCES

Harris et al., "Rosin & Rosin Derivatives," reprint of pages 789–792 of Encyclopedia of Chemical Technology (1953).

DONALD E. CZAJA, Primary Examiner

R. W. GRIFFIN, Assistant Examiner

U.S. Cl. X.R.

117—126, 168; 260—47, 101, 346.6